US 8,606,074 B2

(12) United States Patent
Candelore

(10) Patent No.: US 8,606,074 B2
(45) Date of Patent: *Dec. 10, 2013

(54) METHOD AND SYSTEM FOR ALTERING THE PRESENTATION OF BROADCAST CONTENT

(75) Inventor: Brant L. Candelore, Escondido, CA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 1563 days.

This patent is subject to a terminal disclaimer.

(21) Appl. No.: 11/453,123

(22) Filed: Jun. 13, 2006

(65) Prior Publication Data
US 2007/0286583 A1  Dec. 13, 2007

(51) Int. Cl.
*H04N 5/77* (2006.01)

(52) U.S. Cl.
USPC ........... 386/225; 386/230; 386/231; 386/234; 386/241; 386/329

(58) Field of Classification Search
USPC .............................. 386/112, 52, 249, 250, 251
See application file for complete search history.

(56) References Cited

U.S. PATENT DOCUMENTS

| | | | |
|---|---|---|---|
| 4,520,404 A | 5/1985 | Von Kohorn | |
| 4,750,213 A | 6/1988 | Novak | |
| 5,343,251 A | 8/1994 | Nafeh | |
| 5,668,917 A * | 9/1997 | Lewine | 386/250 |
| 5,870,151 A * | 2/1999 | Korber | 348/553 |
| 6,061,471 A * | 5/2000 | Coleman, Jr. | 382/173 |
| 6,771,316 B1 * | 8/2004 | Iggulden | 348/553 |
| 6,950,623 B2 | 9/2005 | Brown et al. | |
| 6,985,158 B2 | 1/2006 | Miller et al. | |
| 7,302,160 B1 * | 11/2007 | Wells | 386/250 |
| 2003/0063674 A1 * | 4/2003 | Tapson | 375/240.19 |
| 2003/0115595 A1 * | 6/2003 | Stevens et al. | 725/32 |
| 2004/0226035 A1 * | 11/2004 | Hauser, Jr. | 725/9 |
| 2006/0047624 A1 * | 3/2006 | Ando et al. | 707/1 |
| 2006/0074744 A1 | 4/2006 | Bodlaender et al. | |

* cited by examiner

*Primary Examiner* — Thai Tran
*Assistant Examiner* — Girumsew Wendmagegn
(74) *Attorney, Agent, or Firm* — John L. Rogitz

(57) ABSTRACT

Embodiments of the present invention are directed to a method and system for altering a presentation of broadcast content. More specifically, embodiments provide an accurate and efficient mechanism for suppressing advertisements by using downloaded templates to identify advertisements before suppression for a duration indicated by information downloaded about the advertisement, where the suppression is effectuated by controlling a display or set-top box using remote-control functionality. In one embodiment, a digital signal comprising broadcast content is accessed. A plurality of templates are received and stored, wherein each template represents a known portion of the broadcast content. The digital signal is then compared against a portion of the plurality of stored templates. Upon a match, a control signal operable to alter a component of a presentation of the known portion of the broadcast content is generated.

11 Claims, 11 Drawing Sheets

METHOD AND SYSTEM FOR ALTERING THE PRESENTATION OF BROADCAST CONTENT

RELATED APPLICATIONS

The present application is related to U.S. patent application Ser. No. 11/453,113, filed Jun. 13, 2006, entitled "METHOD AND SYSTEM FOR ALTERING THE PRESENTATION OF RECORDED CONTENT," naming Brant Candelore as the inventor, assigned to the assignee of the present invention. That application is incorporated herein by reference in its entirety and for all purposes.

FIELD OF THE INVENTION

Embodiments of the present invention are related to the field of presentation alteration for broadcast content.

BACKGROUND OF THE INVENTION

Most every business entity advertises to promote products or services, and often pays significant sums of money on such activities to broadcasters and service providers. Given that most acknowledge that broadcast media provides wide exposure, advertisements generate large amounts of revenue for broadcasters and service providers. Therefore, in an effort to increase revenue, broadcasters and service providers may take any steps necessary to encourage advertising.

On the other hand, consumers are generally less entertained by advertising. To most, an advertisement is an unwanted pause in a program with generally increased volume, and therefore, a significant inconvenience. As such, the volume on a television set may be muted during a commercial within broadcast. Alternatively, a user may change the channel or turn the television set off during a commercial. Although this may effectively suppress an advertisement if successfully executed, such methods are laborious and prone to error given that a user must guess as to when the commercial break will end.

In addition to broadcast content, recorded content may also contain advertisements if it was recorded from a broadcast. As such, time-shifted content on VHS or personal video recorders may contain the same annoyances as broadcast content. Although users may employ the techniques discussed above to suppress commercials in recorded content, the previously-mentioned drawbacks persist. Moreover, despite the ability to fast-forward through commercials, users must still deal with undershoot and overshoot problems. For example, if a user fast-forwards past an advertisement adjoining a program, he or she must then rewind to the correct location, thereby risking the same over/undershoot problems. Similarly, if the user stops the fast-forwarding prematurely, then he or she must either watch the remaining commercial or fast-forward again risking under/overshoot. Thus, despite the advantages of time shifting over viewing in real-time, commercial suppression in recorded content is still a manual and laborious task that is prone to error, thereby exacerbating the annoyance and inconvenience brought by commercials in the first place.

SUMMARY OF THE INVENTION

Accordingly, a need exists to more conveniently and effectively suppress advertisements in broadcasts. Additionally, a need exists to more accurately and efficiently identify advertisements within broadcasts. A need also exists to more accurately and efficiently determine the beginning and end of an advertisement in a manner which reduces user interaction. Embodiments of the present invention provide novel solutions to these needs and others as described below.

Embodiments of the present invention are directed to a method and system for altering a presentation of broadcast content. More specifically, embodiments provide an accurate and efficient mechanism for suppressing advertisements by using downloaded templates to identify advertisements before suppression for a duration indicated by information downloaded about the advertisement, where the suppression is effectuated by controlling a display or set-top box using remote-control functionality. In one embodiment, a digital signal comprising broadcast content is accessed. The digital signal may be produced from an analog broadcast signal, digital broadcast signal (e.g., over a terrestrial connection, over the internet using internet protocol (IP) packets, over a home network using IEEE 1394, etc.), camera input providing a visual representation of the content, microphone input providing an aural representation of the content, etc. A plurality of templates are received (e.g., from a database) and stored, wherein each template represents a known portion of the content (e.g., an advertisement to be suppressed). The digital signal is then compared against a portion of the plurality of stored templates. Upon a match, a control signal operable to alter a component of a presentation of the known portion of the content is generated. The control signal may alter an audio component of the portion of the broadcast content (e.g., advertisement muted, etc.). Additionally, a video component may be altered (e.g., blank frame displayed, channel changed, etc.).

More specifically, one embodiment of the present invention pertains to a method for altering a presentation of broadcast content. The method includes: accessing a digital signal comprising the broadcast content; receiving and storing a plurality of templates, wherein each template represents a known portion of the broadcast content; comparing the digital signal against a portion of the plurality of stored templates; and upon a match, generating a control signal operable to alter a component of a presentation of the known portion of the broadcast content.

Another embodiment of the present invention pertains to a system for altering a presentation of broadcast content. The system includes: a digitizer for accessing a digital signal comprising said broadcast content; a memory for receiving and storing a plurality of templates, wherein each template represents a known portion of the broadcast content; a comparator for comparing the digital signal against a portion of the plurality of stored templates; and circuitry for generating a control signal upon a match, wherein the control signal is operable to alter a component of a presentation of the known portion of the broadcast content.

Another embodiment of the present invention pertains to a method for altering a presentation of broadcast content, wherein the content includes an advertisement. The method includes: receiving and storing information about the advertisement from a database; accessing the stored information to determine a duration of the advertisement; altering a component of the presentation for a period of time related to the duration; and restoring the component of the presentation upon an expiration of the period of time.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION OF THE INVENTION

Figure 1:
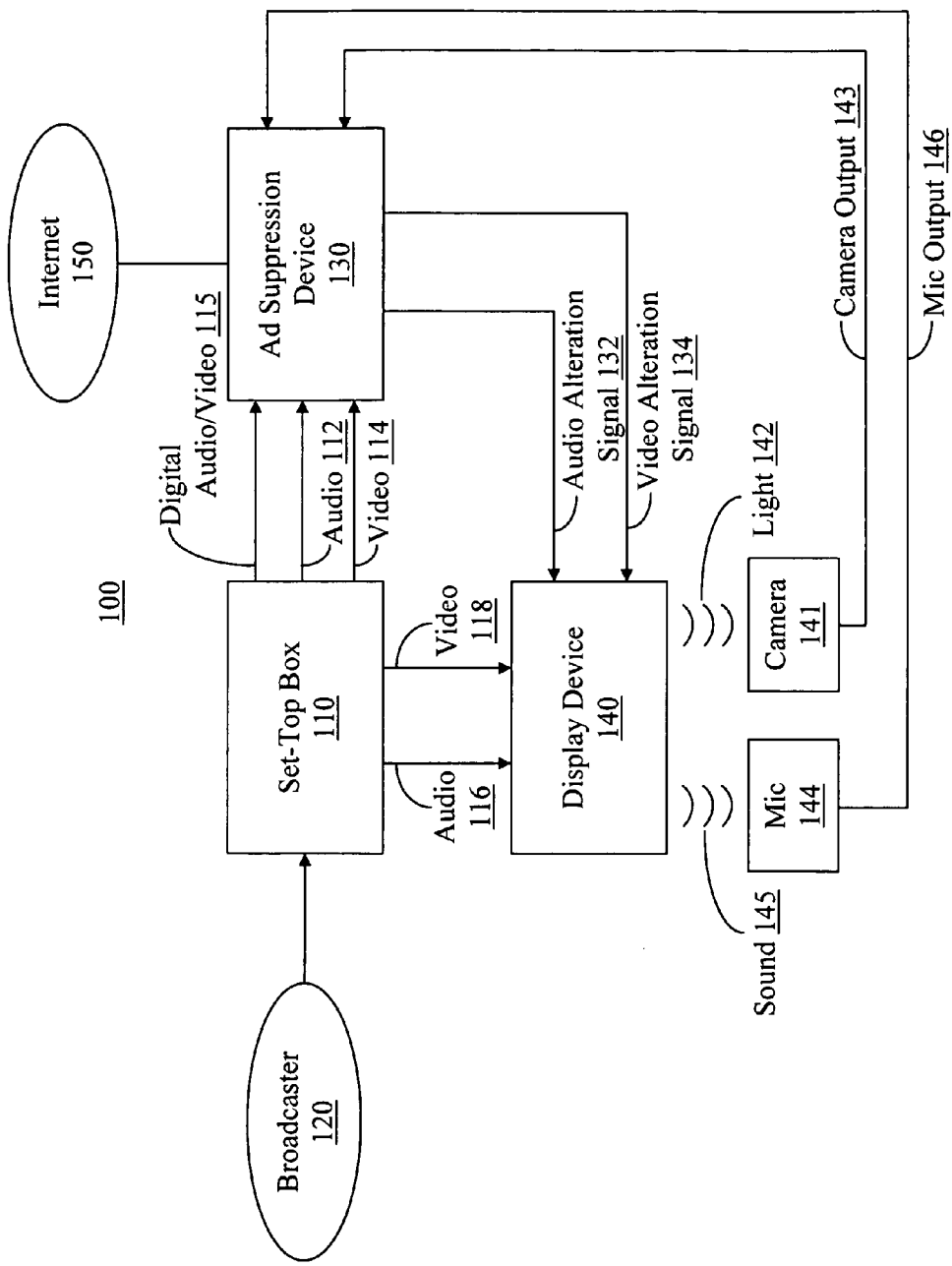
FIG. 1 shows a block diagram depicting an exemplary system for alteration of presentations of broadcast content in accordance with one embodiment of the present invention.

Reference will now be made in detail to embodiments of the present invention, examples of which are illustrated in the accompanying drawings. While the present invention will be discussed in conjunction with the following embodiments, it will be understood that they are not intended to limit the present invention to these embodiments alone. On the contrary, the present invention is intended to cover alternatives, modifications, and equivalents which may be included with the spirit and scope of the present invention as defined by the appended claims. Furthermore, in the following detailed description of the present invention, numerous specific details are set forth in order to provide a thorough understanding of the present invention. However, embodiments of the present invention may be practiced without these specific details. In other instances, well-known methods, procedures, components, and circuits have not been described in detail so as not to unnecessarily obscure aspects of the present invention.

Notation and Nomenclature

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing the terms such as "identifying," "defining," "determining," "performing," "processing," "comparing," "repeating," "creating," "modifying," "assigning," "moving," "establishing," "using," "calculating," "adding," "accessing," "generating," "limiting," "revoking," "restoring," "copying," "digitizing," "receiving," "storing," "decoding," "recording," "producing," "altering," "accelerating," "skipping," "changing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the Invention

FIGS. 1, 2, 3, 4A, 4B and 5 concern the alteration of presentations of broadcast content, while FIGS. 6, 7, 8, 9A and 9B concern the alteration of presentations of recorded content. Each embodiment will be described in turn.

Alteration of Presentations of Broadcast Content

FIG. 1 shows block diagram 100 depicting an exemplary system for alteration of presentations of broadcast content in accordance with one embodiment of the present invention. As shown in FIG. 1, set-top box 110 converts a broadcast signal from broadcaster 120 into analog audio 112 and video 114 sent to ad suppression device 130 and audio 116 and video 118 sent to display device 140. Set-top box 110 may also convert a broadcast signal from broadcaster 120 into digital audio/video 115 sent to ad suppression device 130. Ad suppression device 130 may be coupled to Internet 150, and is capable of receiving input signals used to generate control signals (e.g., audio alteration signal 132 and video alteration signal 134) to alter the presentation of broadcast content via display device 140.

Set-top box 110 may be any device capable of receiving a digital or analog broadcast signal and decoding and outputting corresponding audio and video signals (e.g., audio 112, video 114 and digital audio/video 115). It is appreciated that audio 116 and video 118 may be either analog or digital signals capable of presentation (e.g., on display device 140). Where audio 116 is a digital signal, any well-known digital audio interface may be used (e.g., S/PDIF, I$^2$S, etc.). Similarly, where video 118 is a digital signal, any well-known digital video interface may be used (e.g., HDMI, DVI, IEEE 1394, etc.). Additionally, audio 116 may comprise a digital interface when video 118 comprises an audio interface, and vice versa. Accordingly, it should be understood that set-top box 110 may include components and circuitry necessary to input, output, convert, adjust and/or process such audio and video signals.

Although no user inputs to set-top box 110 are shown in FIG. 1, it should be understood that set-top box 110 may include a user interface (e.g., graphical user interface (GUI), command line interface, touch screen interface, voice-activated interface, menu-driven interface, manual switch, etc.). As such, although audio 112, audio 116 and an audio portion of digital audio/video 115 are derived from the same broadcast signal (e.g., that of broadcaster 120), it should be understood that each may be altered independently (e.g., volume reduced, etc.) by either set-top box 110 and/or a user input. Similarly, although video 114, video 118 and a video portion of digital audio/video 115 are derived from the same broadcast signal (e.g., that of broadcaster 120), it should be understood that each may be altered independently by either set-top box 110 and/or a user input.

As shown in FIG. 1, ad suppression device 130 may use both analog and digital input signals to determine how to alter the presentation of broadcast content on a display device (e.g., 140) via audio/video alteration signals (e.g., 132 and 134). For example, input signals from set-top box 110 (e.g., 112, 114 and/or 115) may be used. Alternatively, camera output 143 from camera 141 (e.g., based upon light 142 representing a still or motion portion of the broadcast content displayed on display device 140) may be used by ad suppression device 130 to determine how to alter the presentation of broadcast content. And in another embodiment, mic output 146 from mic 144 (e.g., based upon sound 145 representing an audio portion of the broadcast content from display device 140) may be used.

Audio alteration signal 132 may be transmitted to any analog or digital input of a display device via either a wired or wireless (e.g., infrared remote, etc.) interface. Similarly, video alteration signal 134 may be transmitted to any analog or digital input of a display device via either a wired or wireless (e.g., infrared remote, etc.) interface. As such, audio alteration signal 132 and video alteration signal 134 provide remote-control functionality (e.g., any command executed by a remote for a given display device) to ad suppression device 130.

For example, upon determining that an advertisement is being broadcast, ad suppression device 130 may execute any command conventionally carried out by a remote control to alter the video (e.g., rendering a menu which overlays the displayed presentation, altering the size of the window displaying the content, activating a programming guide, changing channels, placing the display in standby mode, powering off the display, etc.) displayed on the display device (e.g., 140) or the sound (e.g., reducing the volume, muting, replacing with supplemental audio, etc.) reproduced by either the display device or a remote amplification system (not shown), thereby altering or suppressing the advertisement.

Although the output interfaces carrying audio/video signals from set-top box 110 may utilize different signaling techniques and possibly contain signal alterations, it should be understood that the ad suppression device interface (e.g., audio 112, video 114 and/or digital audio/video 115) and the display interface (e.g., audio 116 and video 118) should be synchronized such that ad suppression device 130 may track what is currently being presented via display device 140 to enable advertisement alteration or suppression. For example, if the presentation on display device 140 is delayed due to buffering, re-clocking, etc., then ad suppression device 130 may account for this (e.g., via another interface (not shown), etc.). As such, ad suppression device 130 may alter content presented on display device 140 more precisely (e.g., closer to the beginning of an advertisement), thereby reducing premature or delayed alteration.

As shown in FIG. 1, ad suppression device 130 may receive advertisement templates and other information necessary to carry out content alteration from Internet 150. Templates representing advertisements may be downloaded from another system or database (not shown) coupled to Internet 150 on a regular basis. As such, ad suppression device 130 may download templates and make comparisons with the content input via audio 112, video 114, digital audio/video 115, camera output 143 and/or mic output 146 (e.g., after digitizing, decoding, encoding, etc.) to determine if an advertisement is being displayed. Upon detecting an advertisement, ad suppression device 130 may alter the presentation of the content comprising the advertisement until the end of the advertisement is detected (e.g. by downloading information as to the duration of the advertisement from Internet 150), at which time the presentation of the content may be restored to an unaltered state.

Templates downloaded via Internet 150 for advertisement detection purposes may comprise audio and/or video content. For example, an audio segment may be downloaded in any audio file format recognizable by ad suppression device 130 (e.g., WAV, MP3, etc.), and then compared with the audio supplied for the broadcast content (e.g., after digitizing, decoding and/or encoding). Similarly, a video segment may be downloaded in any video file format recognizable by ad suppression device 130 (e.g., I-frame, MPEG, VC1, AVI, etc.) for comparative purposes. Thus, after processing (e.g., digitizing, decoding and/or encoding, compressing and/or decompressing, etc.) the audio and/or video input signals, ad suppression device 130 may compare the downloaded template to the input signal (e.g., an extracted portion thereof) to determine if an advertisement is currently being presented. Upon detecting a match, the advertising content may be altered by ad suppression device 130 as discussed above.

Figure 2:
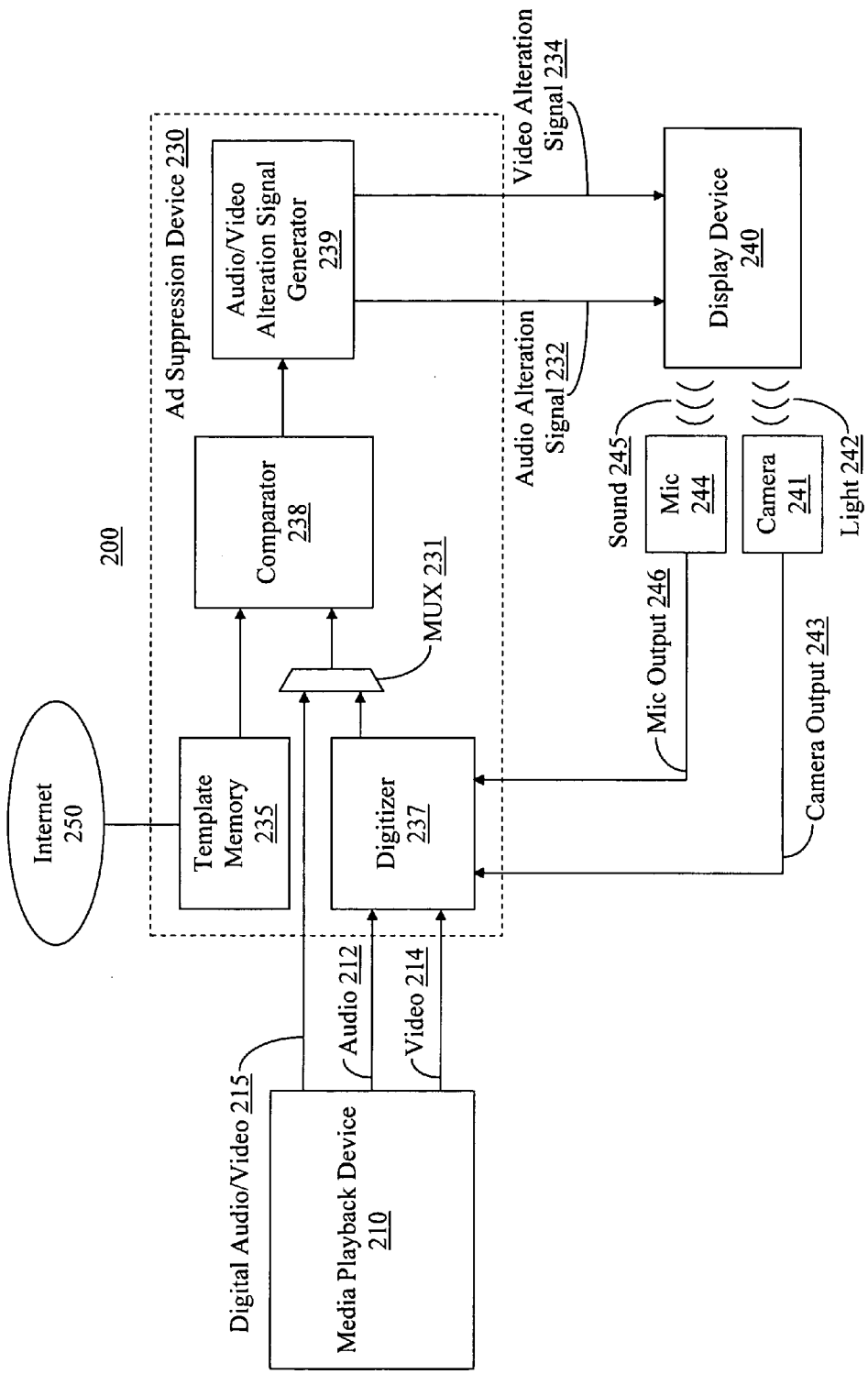
FIG. 2 shows a block diagram depicting an exemplary advertisement suppression device in accordance with one embodiment of the present invention.

FIG. 2 shows block diagram 200 depicting an exemplary advertisement suppression device in accordance with one embodiment of the present invention. Ad suppression device 230, as denoted by the dashed box in FIG. 2, may be used interchangeably with ad suppression device 130 of FIG. 1.

As shown if FIG. 2, ad suppression device 230 may receive both analog and digital signals. For example, analog audio 212, analog video 214 and/or digital audio/video 215 from media playback device 210 (e.g., set-top box 110) may be input. Additionally, camera output 243 from camera 241 (e.g., based upon light 242 representing a still or motion portion of the broadcast content displayed on display device 240) and mic output 246 from mic 244 (e.g., based upon sound 245 representing an audio portion of the broadcast content from display device 240) may be input to ad suppression device 230, where the signals may be either analog or digital. The analog audio/video signals may then be digitized in digitizer 237 to produce a digital signal representing the broadcast content. Digital signals from digitizer or other digital inputs (e.g., 215, digital camera output (not shown), digital mic output (not shown), etc.) may then be fed to MUX 231 for access by comparator 238.

Template memory 235 may receive and store advertisement templates from Internet 250 (e.g., via a remote database) for access by comparator 238. The templates may comprise audio and/or video segments as discussed above with respect to FIG. 1. Additionally, template memory 235 may comprise any register or memory (e.g., flash memory, volatile random access memory, non-volatile read only memory, optical and/or magnetic physical media, etc.) capable of storing and providing access to the advertisement templates.

Comparator 238 may comprise logic and/or circuitry capable of comparing portions of the digital signal output from MUX 231 with templates within template memory 235. For example, comparator 238 may be implemented using central processing units and/or digital signal processing units. Upon detecting a match, comparator 238 may send a signal to audio/video alteration signal generator 239 to in turn generate audio alteration signal 232 and/or video alteration signal 234. The alteration signal or signals may then be received by display device 240 to alter the presentation of the broadcast content as discussed above with respect to FIG. 1.

Figure 3:
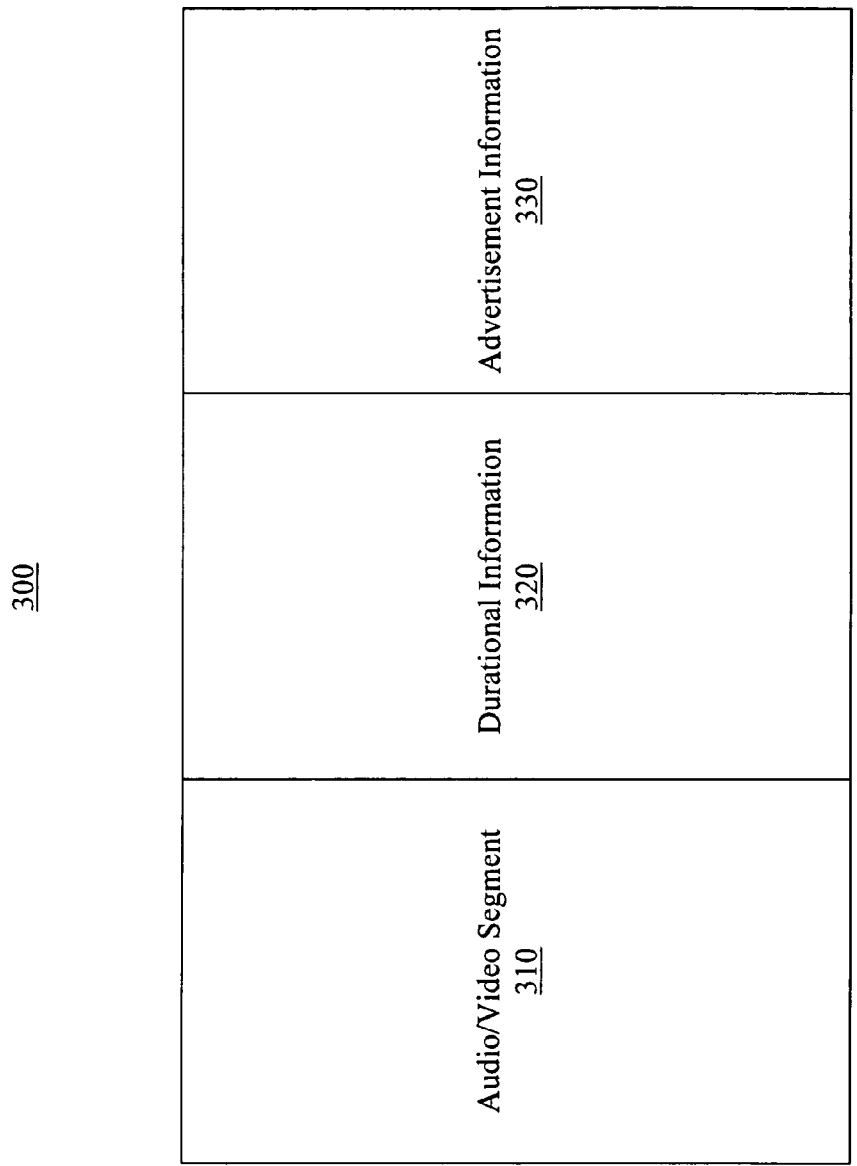
FIG. 3 shows an exemplary advertisement template in accordance with one embodiment of the present invention.

FIG. 3 shows exemplary advertisement template 300 in accordance with one embodiment of the present invention. As shown in FIG. 3, advertising template 300 may comprise three sections, where each section provides information to an ad suppression device (e.g., 130 or 230) to permit efficient storage and use of the templates. Although only three sections are depicted in FIG. 3, it should be appreciated that a larger or smaller number of sections may be used in other embodiments.

Audio/video segment 310 may include digitized audio and/or video segments for comparison with digital portions of content (e.g., by comparator 238), where audio/video segment 310 may be encoded. For example, when audio/video segment 310 comprises audio data, the segment may be encoded in WAV format, or optionally encoded in compressed form as a MP3, OGG, or similar file. When audio/video segment 310 comprises video data, the video may be encoded in any well-known format (e.g., I-frame, MPEG, VC1, AVI, etc.). As such, the size of template 300 may be reduced by including shorter audio and/or video segments, and additionally by compressing the data comprising audio/video segment 310. Thus, embodiments provide for increased-speed, lower-bandwidth transfers of templates to ad suppression devices (e.g., 130 or 230).

Durational information 320 may provide data as to the number of frames or the run time of an advertisement represented by advertisement template 300. As such, durational information 320 may provide an ad suppression device with information to enable the device to return the presentation of content to an unaltered state (e.g., when a commercial break ends and a program returns). Moreover, durational information 320 may comprise a very small amount of data (e.g., a few bytes), thereby maintaining the increased-speed, low-bandwidth transferability of template 300.

Advertisement information 330 may provide information about the advertisement itself to enable improved storage and access by an ad suppression device (e.g., 130 or 230). For example, advertisement templates may be grouped by type of product or service advertised, business entity affiliated with the advertisement, etc. Such a grouping may improve storage times since, for example, other advertisement templates may not need to be accessed when storing a new template since stored templates may have already been identified and/or grouped. Moreover, access times may be reduced since only a subset of the stored templates need to be accessed to perform comparisons with digitized content (e.g., by comparator 238) when identifying information is discerned from the digitized content (e.g., output from MUX 231).

Figure 4A:
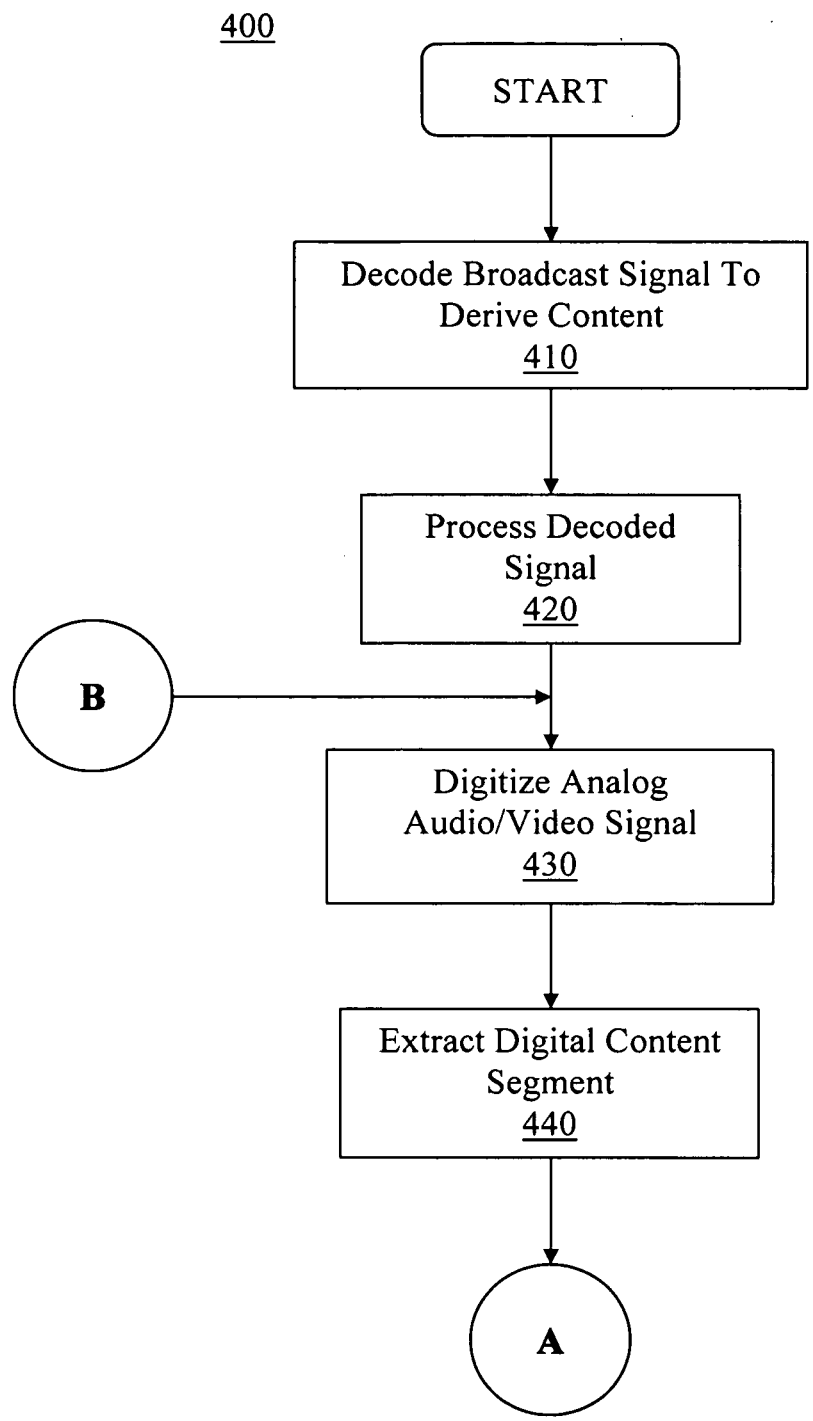
FIG. 4A shows a first portion of a computer-controlled process for alteration of presentations of broadcast content in accordance with one embodiment of the present invention.
Figure 4B:
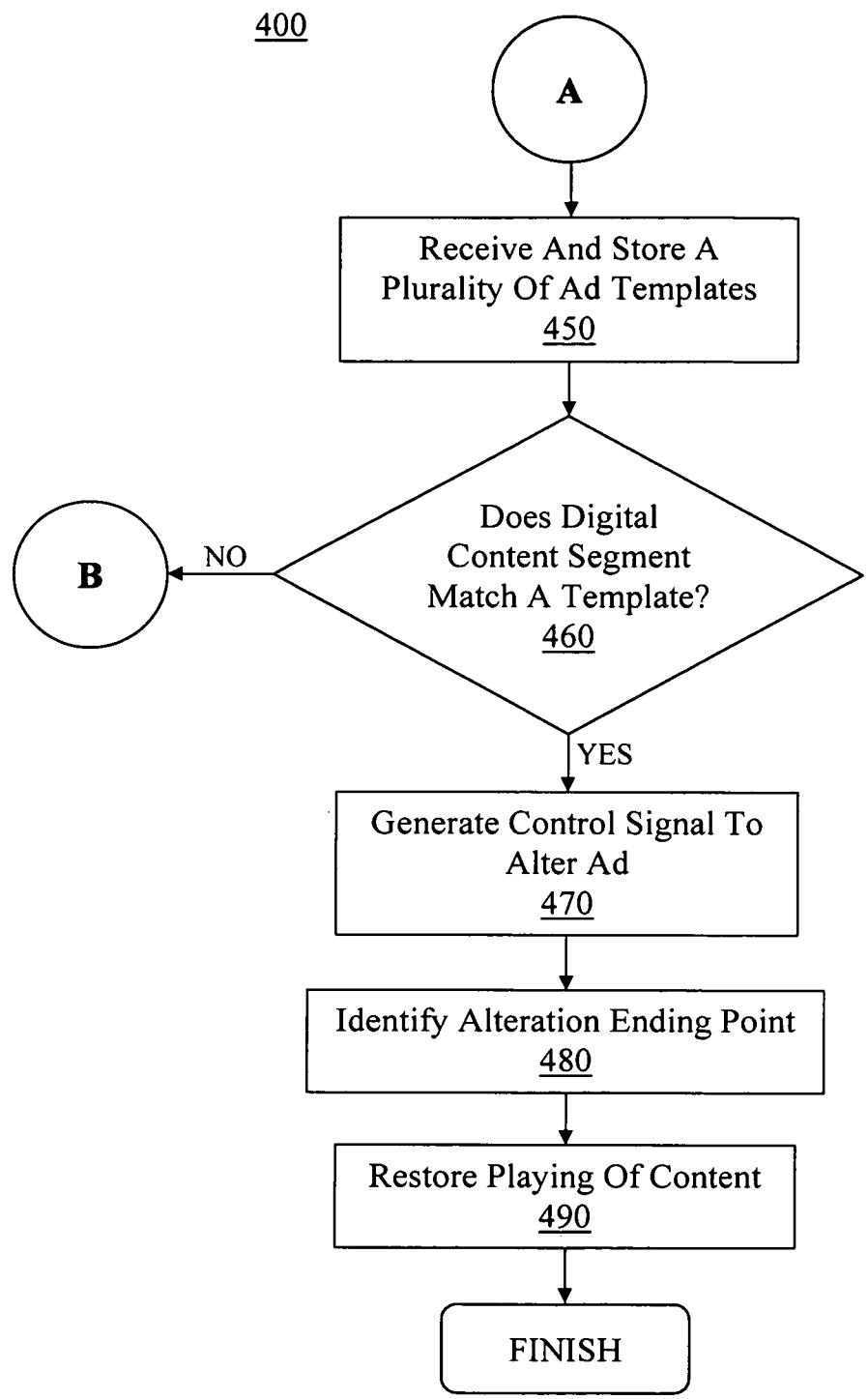
FIG. 4B shows a second portion of a computer-controlled process for alteration of presentations of broadcast content in accordance with one embodiment of the present invention.

FIGS. 4A and 4B show computer-controlled process 400 for alteration of presentations of broadcast content in accordance with one embodiment of the present invention. As the steps of process 200 are described herein, reference will be made to FIGS. 1, 2 and 3 to provide examples and help clarify the discussion.

As shown in FIG. 4A, step 410 involves decoding a broadcast signal. Such decoding may be performed by a set-top box (e.g., 110) to derive content transmitted from a broadcaster (e.g., 120) over a terrestrial or wireless connection. Decoding may involve deriving separate audio and video signals. Alternatively, the combined audio and video signal may be converted to another form for later dissection. Additionally, the broadcast signal may be either digital or analog as discussed above, and may be encrypted for additional security. If encrypted, the decoding and decrypting may occur in any order.

After decoding and/or decrypting the broadcast signal to produce a decoded signal or signals, the decoded signal or signals may be processed in step 420. In a set-top box capable of receiving and outputting digital and analog signals (e.g., 110), either digital or analog processing may be performed to ready the signal for transmission to the ad suppression device (e.g., 130 and/or 230). For example, an analog broadcast signal input to the set-top box may undergo analog processing if transmitted to the ad suppression device in analog form, or alternatively undergo either analog and/or digital processing if transmitted to the ad suppression device in digital form. Similarly, a digital broadcast signal input to the set-top box may undergo digital processing if transmitted to the ad suppression device in digital form, or alternatively undergo either analog and/or digital processing if transmitted to the ad suppression device in analog form. In another embodiment, the set-top box may perform analog and/or digital processing in step 420 regardless of the form of the signal transmitted to the ad suppression device.

In another embodiment, a decoded signal that has not yet been split into audio and video signals may be further processed in step 420 in combined form. After the processing has been performed, the signal may then be split into audio and video signals (e.g., analog and/or digital). After being split, additional processing may be performed.

As shown in FIG. 4A, step 430 involves digitizing analog audio and/or video signals comprising the broadcast content. As such, analog-to-digital conversion should be performed in step 430 along with any necessary signal processing (e.g., current-to-voltage conversion, amplification, etc.) to prepare the signals for comparison (e.g., by comparator 238) with ad templates (e.g., 300). Consequently, it should be appreciated that step 430 may be bypassed if the broadcast content is already in a digital format suitable for comparison.

Once a digital signal comprising the broadcast content is present, a digital content segment may be extracted in step 440. The extracted segment may be of a size and format enabling comparison with an audio/video segment of a downloaded template (e.g., 310). As such, it should be appreciated that the content segment may comprise more or less content than contained in the template.

As shown in FIG. 4B, step 450 involves receiving and storing a plurality of advertisement templates, where such templates may be downloaded to an ad suppression device (e.g., 130 or 230). As discussed above with regard to FIGS. 1 and 3, such templates may comprise audio and/or video segments of broadcast content (e.g., advertisements). Moreover, such segments may be small in size (e.g., a short sound byte, an I-frame, etc.) to allow quick download from a database, thereby increasing the utility of the ad suppression device when coupled to a slow Internet connection. Additionally, as new commercials are aired, the database may be updated to help identify new advertisements. For example, upon discovering an advertisement without an associated template in the database, a sequence of frames or a sound byte may be recorded, compressed, processed to produce a template and uploaded to the database for future download by ad suppression devices.

Once an advertisement template is downloaded (e.g., via Internet 150 or 250), it may be stored in memory for future access. The memory may be a storage device within the ad suppression device (e.g., 130 or 230), including but not limited to a hard disk drive, flash memory, random access memory, read only memory or the like. Alternatively, the templates may be stored in a device or system coupled to the ad suppression device. As such, the templates may be accessed quickly given their local storage and small size, thereby increasing the responsiveness of the system. Moreover, a large number may be stored in a small place given the small size of the templates, thereby extending the increased responsiveness to a larger number of advertisements.

After digitizing a content segment, a determination is made in step 460 as to whether a portion of the digital content segment (e.g., extracted in step 440) matches a portion of a stored template (e.g., audio/video segment 310), where the comparison may be performed by a comparator (e.g., 238) within the ad suppression device (e.g., 130 or 230). If a template accessed from a template memory (e.g., 235) does not match a portion of the digital content segment, then steps 430, 440 and 450 may be repeated until a match is detected. Additionally, this series of steps may be repeated at various intervals to vary the precision of the advertisement detection and alteration mechanisms of the present invention. For example, the intervals may be lengthened within a given time period after an advertisement has completed, as the probability of another advertisement being broadcast within that time period may be relatively low. Thereafter, the intervals may be decreased to improve precision as the probability of another advertisement being broadcast increases.

However, if a portion of a digital content segment matches a stored template, then a control signal may be generated to alter or suppress the advertisement in step 470. As discussed above with respect to FIG. 1, the ad suppression device (e.g., 130 or 230) may send an audio and/or video alteration signal (e.g., 132 and/or 134) to a display (e.g., 140) and/or audio device (not shown in FIG. 1) presenting content containing an advertisement to be altered or suppressed. The control signal may utilize a remote control interface of the display device, such that the control signal provides remote control functionality to the ad suppression device (e.g., enabling the ad suppression device to activate any function of a remote control of the display device). The audio and/or video alteration may continue until the advertisement being altered ends and the non-advertising content resumes. As such, an alteration ending point may be identified (e.g., by accessing durational information 300 of template 300), at which time the presentation may be returned to an unaltered state.

Figure 5:
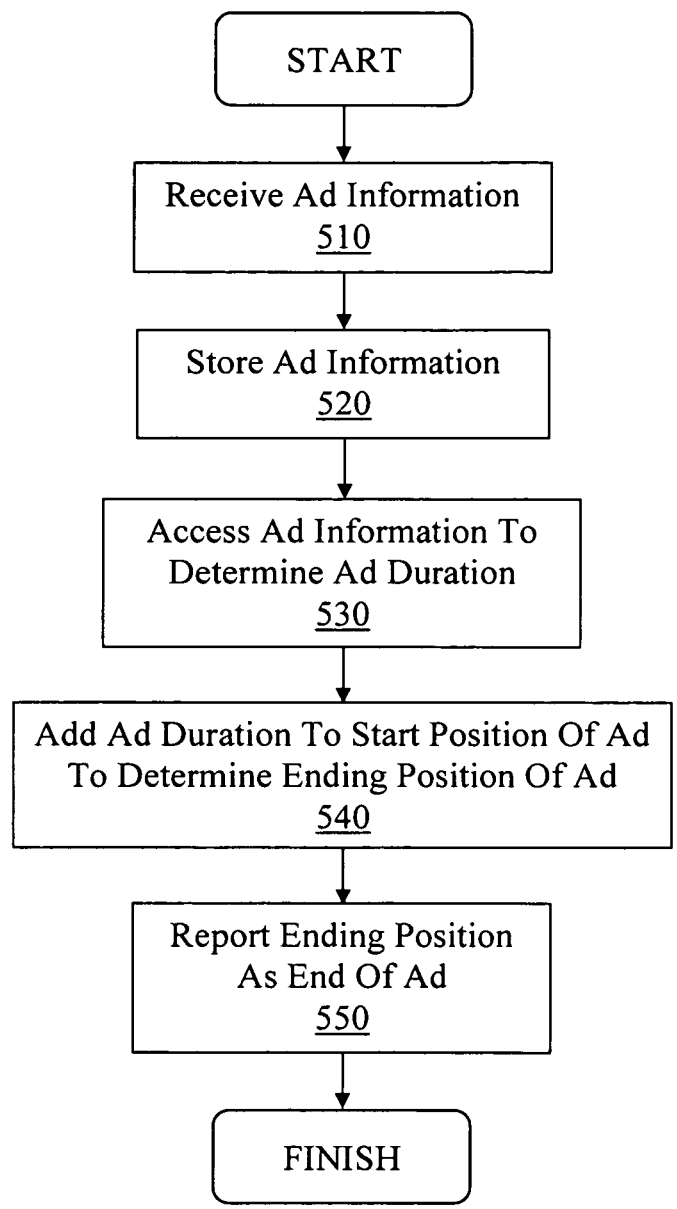
FIG. 5 shows a process for identifying and reporting the end of a broadcast advertisement in accordance with one embodiment of the present invention.

In one embodiment, an alteration ending point may be identified in step 480 using durational information about an advertisement downloaded from an Internet connection (e.g., from Internet 150), which may be performed in accordance with process 500 of FIG. 5. This information may be attached to an audio and/or video template (e.g., as durational information 300 of template 300). Alternatively, this information may be downloaded separately. If the durational information is downloaded separately, the ad suppression device (e.g., 130 or 230) may optionally sort or group the templates and durational information packets to allow faster access to the durational information once an advertisement is identified. Moreover, it should be understood that separating the templates and durational information, the speed at which the ad suppression device may access and compare durational information may be increased given the smaller template sizes and the need to parse the template information from the combined data packet. Regardless of its location, the durational information may then be used to calculate the ending point of the advertisement by adding the duration of an advertisement to its estimated start point (e.g., the point at which a match was discovered). Thereafter, the alteration may be suspended at the calculated end point.

Alternatively, a set of templates for the end of the advertisements (ending templates) may be downloaded and stored to the ad suppression device (e.g., similar to the templates corresponding to the beginning of advertisements in step 440 and depicted in FIG. 3). As such, by performing steps similar to 450 and 460 using the ending templates, digitized and/or encoded content segments may be compared against the ending templates to identify the end of the advertisement. Thereafter, alteration may be suspended at the identified end point.

After suspending alteration, the presentation of the broadcast content may be restored to an unaltered state in step 490. The restoration may be carried out using the same means discussed above with respect to using a control signal to alter the presentation of the content in step 470. As such, audio and video alteration signals (e.g., 132 and/or 134) from the ad suppression device may be used to return the presentation to an unaltered state.

FIG. 5 shows process 500 for identifying and reporting the end of a broadcast advertisement in accordance with one embodiment of the present invention. In one embodiment, process 500 may be used to identify and/or report an alteration ending point in step 480 of FIG. 4B.

As shown in FIG. 5, step 510 involves receiving information about an advertisement. As discussed above with respect to FIG. 4B, the information may be durational information about advertisements received over an Internet connection of an ad suppression device (e.g., either as part of a template or as a separate packet from the template). As discussed above with respect to FIG. 3, the information may comprise a small data packet that indicates the length of the advertisement (e.g., time duration, number of frames, etc.), which then may be used to calculate the end of the advertisement. Thereafter, the information may be stored in step 520 as discussed above in step 450 of FIG. 4B and with respect to FIGS. 1 and 2.

After receiving and storing information about advertisements, the ad suppression device (e.g., 130 or 230) may access durational information (e.g., 320) corresponding to an advertisement to be altered to determine its duration in step 530. The ad suppression device may access each data packet or template individually to make this determination. Alternatively, the data packets or templates may be grouped to speed the search (e.g., by length, number of frames, business entity affiliated with the advertisement, type of product or service advertised, etc.), where the ad suppression device may discern the grouping criteria from the presentation itself, information bundled with the broadcast and/or information contained within the matched template (e.g., advertisement information 330). The ad suppression device may begin searching with an appropriate group first. Thereafter, other groups may then be searched (e.g., in order of decreasing relevance) if the ad information is not found in the first group. Alternatively, a database of stored advertisement information may be indexed using information from the matched template (e.g., 320 or 330) to derive the location (e.g., physical device or component, address within memory, etc.) of the corresponding advertisement information. Thereafter, the information may be accessed to determine durational information (e.g., 320) corresponding to the advertisement.

As shown in FIG. 5, step 540 involves adding the durational information derived in step 530 with a start position of the advertisement to be suppressed to determine an ending position. The start position may be derived from the digitized content segment matched to a template. For example, if a three-frame sequence of a digitized content sequence is matched to a template, then the starting point may be taken from the first frame of that sequence. Alternatively, the second or third frame may be used (e.g., if the first frame is a blank frame). Thereafter, a frame number or time may be assigned to the frame, to which the durational information may be added. Alternatively, where an audio template is matched, the time associated with some point within the matched content segment (e.g., beginning, end, middle, etc.) may be recorded, to which the duration information may be added. As such, a frame or time associated with the content may be determined to be the ending position of the advertisement. Thereafter, the end position may be reported to the ad suppression device (e.g., 130 or 230) in step 550 so that the presentation may be returned to an unaltered state at the appropriate time (e.g., at the conclusion of the advertising content).

Alteration of Presentations of Recorded Content

Figure 6:
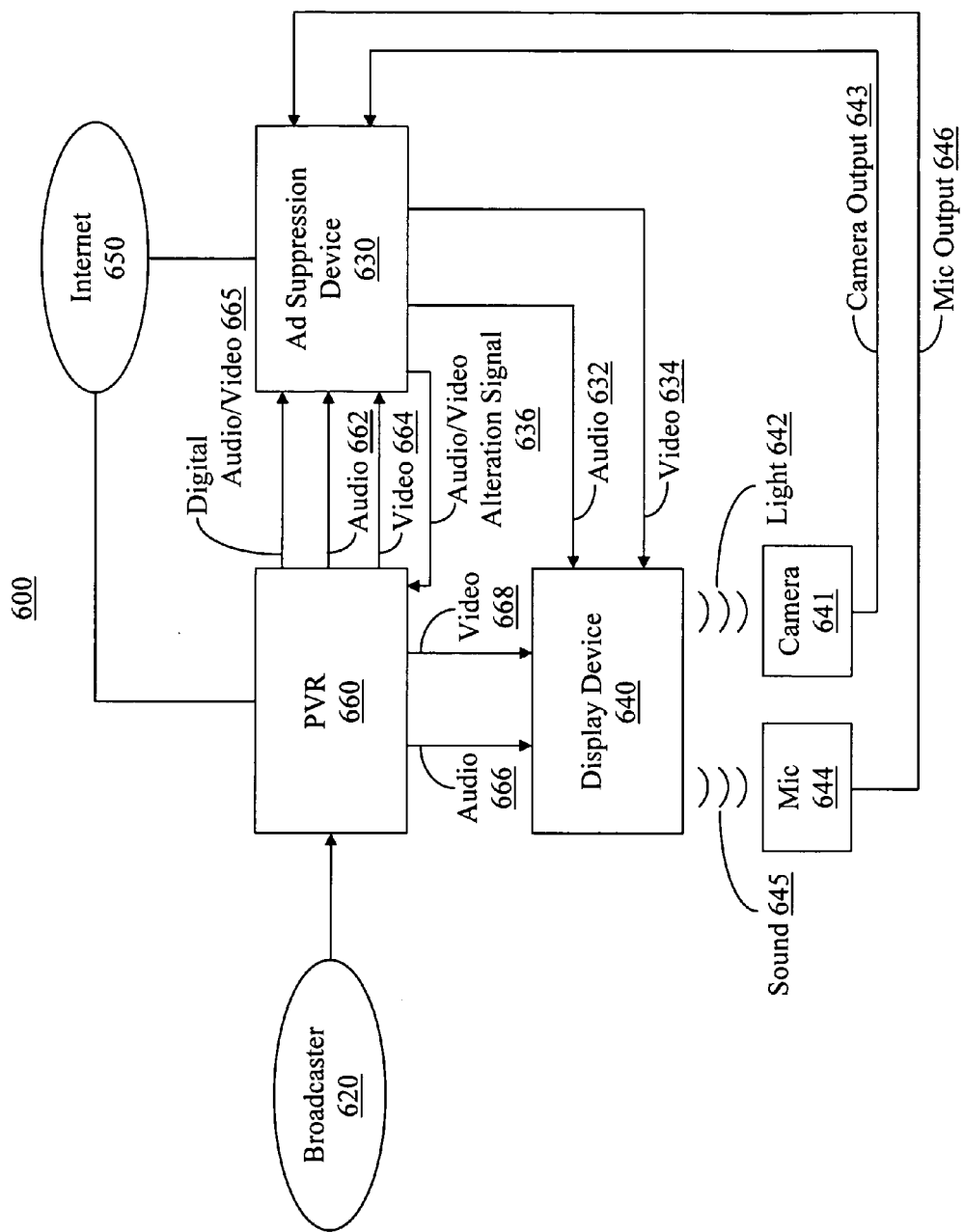
FIG. 6 shows a block diagram depicting an exemplary system for alteration of presentations of recorded content in accordance with one embodiment of the present invention.

FIG. 6 shows block diagram 600 depicting an exemplary system for alteration of presentations of recorded content in accordance with one embodiment of the present invention. As shown in FIG. 6, personal video recorder (PVR) 660 converts a broadcast signal from broadcaster 620 into analog audio 662, analog video 664 and/or digital audio/video 665 sent to ad suppression device 630. Content to be displayed may be sent via audio 666 and video 668 to display device 640. Alternatively, audio and/or video signals may be sent to display device 640 via ad suppression device 630 (e.g., through audio 632 and video 634). Ad suppression device 630 is coupled to Internet 650, and is capable of receiving input signals used to generate a control signal (e.g., audio/video alteration signal 636) to alter the playback of content from PVR 660.

PVR 660 may be any device capable of receiving a digital or analog broadcast signal, recording content decoded from the broadcast signal, and outputting corresponding audio and video signals (e.g., audio 662, video 664 and/or digital audio/video 665). As shown in FIG. 6, PVR 660 may be coupled to Internet 650 to receive programming information, hardware/software updates and the like. The content recorded on PVR 660 may be stored in any device or component coupled to PVR 660 (e.g., a hard disk drive, flash memory, random access memory, read only memory, etc.). It is appreciated that audio 666 and video 668 may be either analog or digital signals capable of presentation (e.g., on display device 640). Where audio 666 is a digital signal, any well-known digital audio interface may be used (e.g., S/PDIF, I²S, etc.). Similarly, where video 668 is a digital signal, any well-known digital video interface may be used (e.g., HDMI, DVI, IEEE 1394, etc.). Additionally, audio 666 may comprise a digital interface when video 468 comprises an audio interface, and vice versa. Accordingly, it should be understood that PVR 660 may include components and circuitry necessary to input, output, convert, adjust and/or process such audio and video signals.

Although no user inputs to PVR 660 are shown in FIG. 6, it should be understood that PVR 660 may include a user interface (e.g., graphical user interface (GUI), command line interface, touch screen interface, voice-activated interface, menu-driven interface, manual switch, etc.). As such, although audio 662, audio 666 (and/or audio 632) and an audio portion of digital audio/video 665 are derived from the same broadcast signal (e.g., that of broadcaster 620), it should be understood that each may be altered independently (e.g., volume reduced, etc.) by either PVR 660 and/or a user input. Similarly, although video 664, video 668 (and/or video 634) and a video portion of digital audio/video 665 are derived from the same broadcast signal (e.g., that of broadcaster 620), it should be understood that each may be altered independently by either PVR 640 and/or a user input.

As shown in FIG. 6, ad suppression device 630 may use both analog and digital input signals to determine how to alter the presentation of recorded content on a display device (e.g., 640) via an audio/video alteration signal (e.g., 636). For example, input signals from PVR 660 (e.g., 662, 664 and/or 665) may be used. Alternatively, camera output 643 from camera 641 (e.g., based upon light 642 representing a still or motion portion of the recorded content displayed on display device 640) may be used by ad suppression device 630 to determine how to alter the presentation of recorded content. And in another embodiment, mic output 646 from mic 644 (e.g., based upon sound 645 representing an audio portion of the recorded content from display device 640) may be used.

Audio/video alteration signal 636 may be transmitted to any analog or digital input of PVR 660 via either a wired or wireless (e.g., infrared remote, etc.) interface. As such, audio/video alteration signal 636 may provide remote-control functionality (e.g., any command executed by a remote for a given PVR) to ad suppression device 630. For example, upon determining that an advertisement is being played, the ad suppression device may execute any command conventionally carried out by a remote control to alter the video (e.g., placing in standby mode, changing channels, accelerating playback from the PVR, skipping ahead, rendering a menu which overlays the displayed presentation, altering the size of the window displaying the content, activating a programming guide, etc.) displayed on the display device (e.g., 640) or the sound (e.g., reducing the volume, muting, replacing with supplemental audio, etc.) reproduced by either the display device or a remote amplification system (not shown), thereby altering or suppressing the recorded advertisement.

Although the output interfaces carrying audio/video signals from PVR 660 may utilize different signaling techniques and possibly contain signal alterations, it should be understood that the ad suppression device interface (e.g., audio 662, video 664 and/or digital audio/video 665) and the display interface (e.g., audio 666 and video 668 and/or audio 632 and video 634) should be synchronized such that ad suppression device 630 may track what is currently being presented via display device 640 to enable advertisement alteration or suppression. For example, if the presentation on display device 640 is delayed due to buffering, reclocking, etc., then ad suppression device 630 may account for this (e.g., via another interface (not shown), etc.). As such, ad suppression device 630 may alter content presented on display device 640 more precisely (e.g., closer to the beginning of an advertisement), thereby reducing premature or delayed alteration.

As shown in FIG. 6, ad suppression device 630 may receive advertisement templates and other information necessary to carry out content alteration from Internet 650. Templates representing advertisements may be downloaded from another system or database (not shown) coupled to Internet 650 on a regular basis. As such, ad suppression device 630 may download templates and make comparisons with the content input via audio 662, video 664, digital audio/video 665, camera output 643 and/or mic output 646 (e.g., after digitizing, decoding, encoding, etc.) to determine if an advertisement is being displayed. Upon detecting an advertisement, ad suppression device 630 may alter the presentation of the content comprising the advertisement until the end of the advertisement is detected (e.g. by accessing durational information for the advertisement), at which time the presentation of the content may be restored to an unaltered state.

Templates downloaded via Internet 650 may be analogous to those discussed above with respect to FIGS. 1 and 3. As such, an audio segment may be downloaded in any audio file format recognizable by ad suppression device 630 (e.g., WAV, MP3, etc.), and then compared with the audio corresponding to the recorded content (e.g., after digitizing, decoding and/or encoding). Similarly, a video segment may be downloaded in any video file format recognizable by ad suppression device 630 (e.g., I-frame, MPEG, VC1, AVI, etc.) for comparative purposes. Thus, after processing (e.g., digitizing, decoding and/or encoding, compressing and/or decompressing, etc.) the audio and/or video input signals, ad suppression device 630 may compare the downloaded template to the input signal (e.g., an extracted portion thereof) to determine if an advertisement is currently being presented. Upon detecting a match, the advertising content may be altered by ad suppression device 630 as discussed above.

Figure 7:
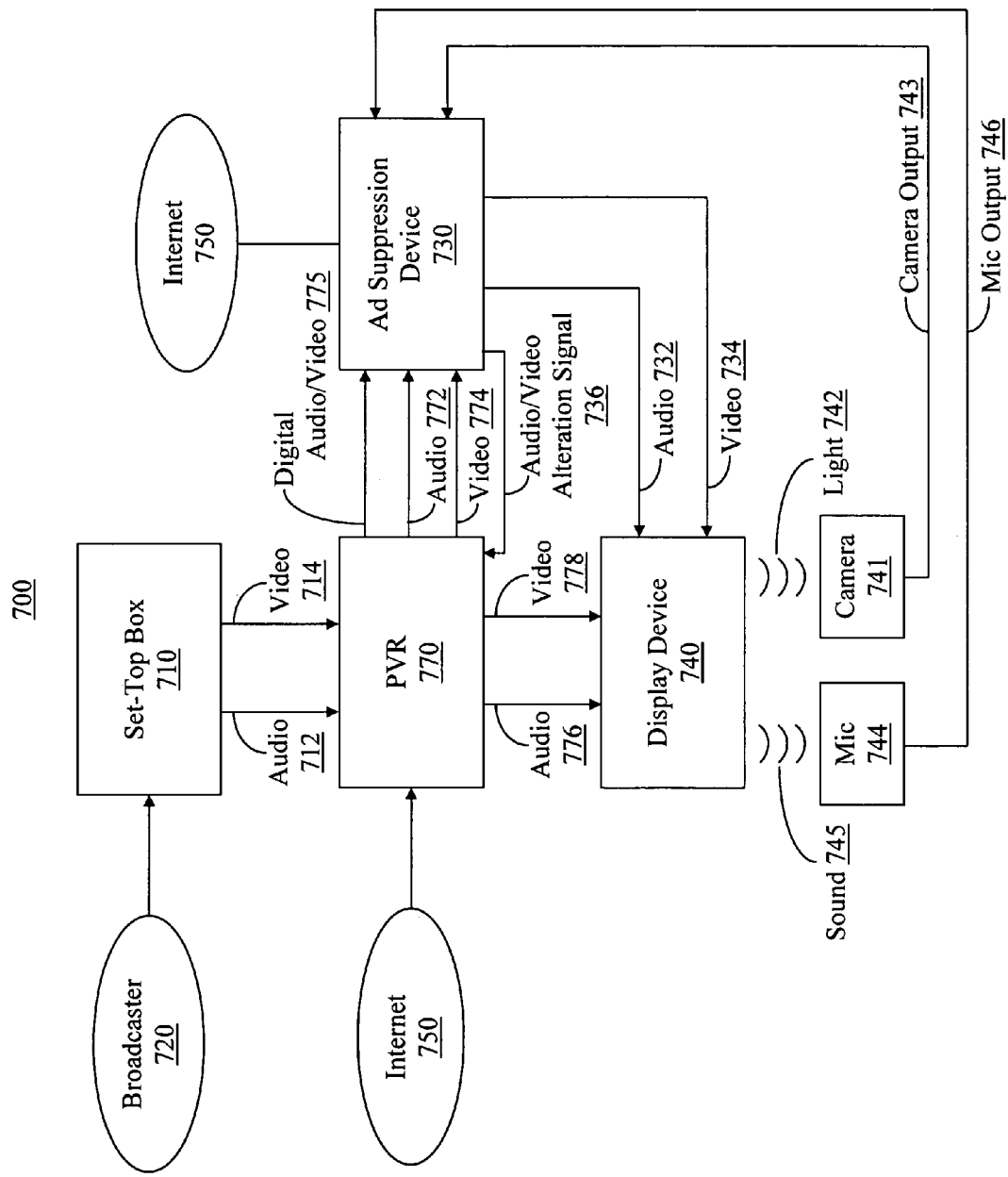
FIG. 7 shows a block diagram depicting an exemplary system for alteration of presentations of recorded content in accordance with one embodiment of the present invention.

FIG. 7 shows block diagram 700 depicting an exemplary system for alteration of presentations of recorded content in accordance with one embodiment of the present invention. Set-top box 710 converts a broadcast signal from broadcaster 720 into audio 712 and video 714 sent to PVR 770, where audio 712 and video 714 may be either digital or analog. PVR 770 may then record and playback content (e.g., via audio 772, video 774 and digital audio/video 775 to ad suppression device 730, and via audio 776 and video 778 to display device 740) output from set-top box 710. Alternatively, audio and/or video signals may be sent to display device 740 via ad suppression device 730 through audio 732 and video 734.

Similar to ad suppression device 630 of FIG. 6, ad suppression device 730 is coupled to Internet 750 and may use both analog and digital input signals to determine how to alter the presentation of recorded content on a display device (e.g., 740) via an audio/video alteration signal (e.g., 736). For example, input signals from PVR 770 (e.g., 772, 774 and/or 775) may be used. Alternatively, camera output 743 from camera 741 (e.g., based upon light 742 representing a still or motion portion of the recorded content displayed on display device 740) may be used by ad suppression device 730 to determine how to alter the presentation of recorded content. And in another embodiment, mic output 746 from mic 744 (e.g., based upon sound 745 representing an audio portion of the recorded content from display device 740) may be used.

PVR 770 may operate analogously to PVR 660, with the exception of an additional audio/video input to receive audio/video signals (e.g., audio 712 and video 714) from a set-top box (e.g., 710). As such, decoding and/or decrypting duties performed by PVR 660 may be offloaded to set-top box 710 as shown in FIG. 7. Thereafter, the decoded/decrypted content may then be transmitted to PVR 770 via audio 712 and video 714. Additionally, PVR 770 may be coupled to Internet 750 to receive programming information, hardware/software updates and the like.

Figure 8:
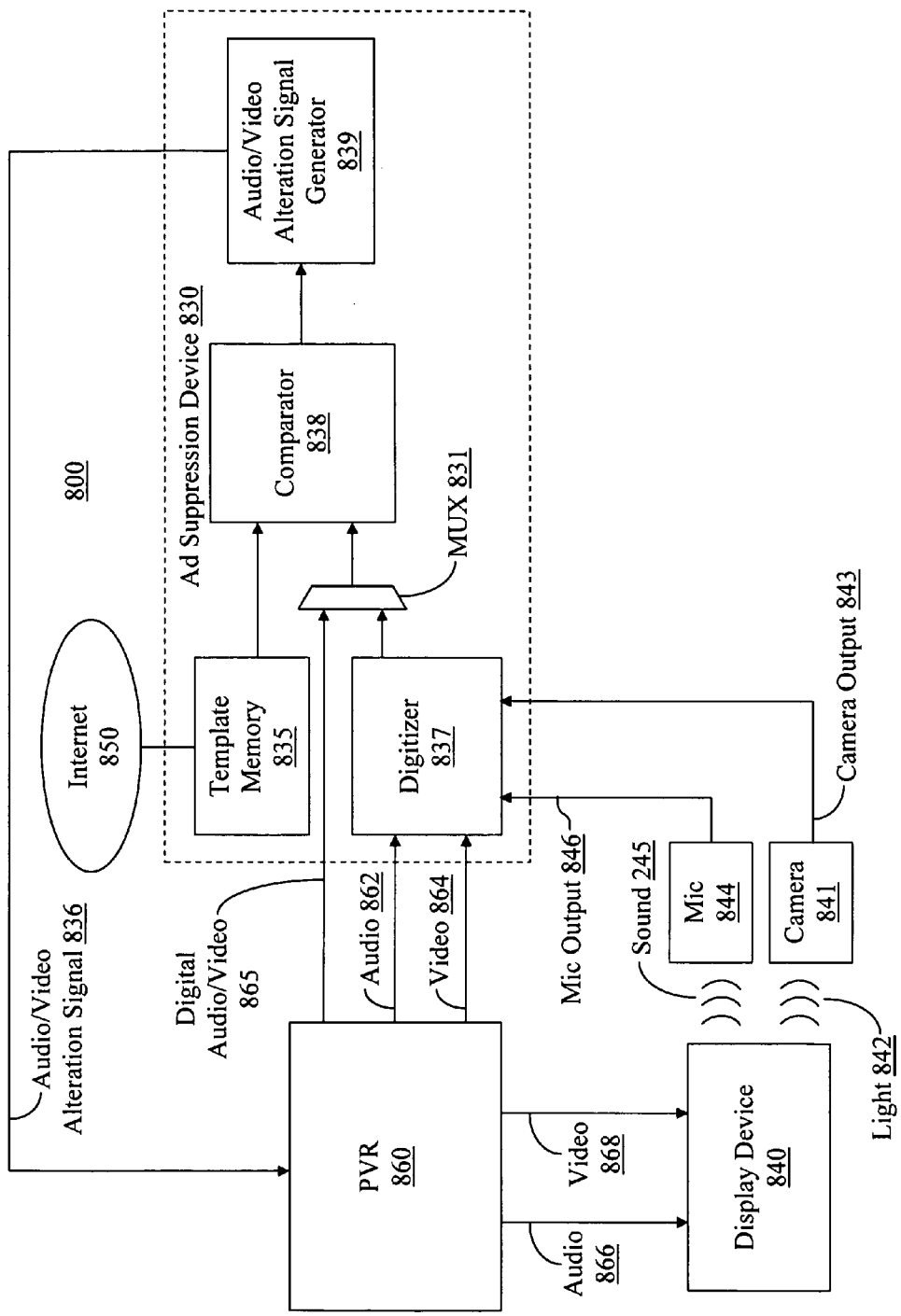
FIG. 8 shows a block diagram depicting an exemplary advertisement suppression device in accordance with one embodiment of the present invention.

FIG. 8 shows block diagram 800 depicting an exemplary advertisement suppression device in accordance with one embodiment of the present invention. Ad suppression device 830 operates similarly to ad suppression device 230 of FIG. 2, except that audio/video alteration signal 836 provides remote control functionality of PVR 860 to suppress advertisements rather than providing remote control functionality of a display device displaying broadcast content. Additionally, ad suppression device 830, as denoted by the dashed box in FIG. 8, may be used interchangeably with ad suppression device 630 of FIG. 6 or ad suppression device 730 of FIG. 7.

As shown if FIG. 8, ad suppression device 830 may receive both analog and digital signals. For example, analog audio 862, analog video 864 and/or digital audio/video 865 from PVR 860 may be input. Additionally, camera output 843 from camera 841 (e.g., based upon light 842 representing a still or motion portion of the broadcast content displayed on display device 840) and mic output 846 from mic 844 (e.g., based upon sound 845 representing an audio portion of the broadcast content from display device 840) may be input to ad suppression device 830, where the signals may be either analog or digital. The analog audio/video signals may then be digitized in digitizer 837 to produce a digital signal representing the broadcast content. Digital signals from digitizer or other digital inputs (e.g., 815, digital camera output (not shown), digital mic output (not shown), etc.) may then be fed to MUX 831 for access by comparator 838.

Template memory 835 may operate analogously to template memory 235 of FIG. 2, thereby receiving and storing advertisement templates from Internet 850 (e.g., via a remote database) for access by comparator 838. The templates may comprise audio and/or video segments as discussed above with respect to FIGS. 6 and 7. Additionally, template memory 835 may comprise any register or memory (e.g., flash memory, volatile random access memory, non-volatile read only memory, optical and/or magnetic physical media, etc.) capable of storing and providing access to the advertisement templates.

Comparator 838 may comprise logic and/or circuitry capable of comparing portions of the digital signal output from MUX 838 with templates within template memory 835, where comparator 838 may operate analogously to comparator 238 of FIG. 2. For example, comparator 238 may be implemented using central processing units and/or digital signal processing units. Upon detecting a match, comparator 838 may send a signal to audio/video alteration signal generator 839 to in turn generate audio/video alteration signal 836. The alteration signal may then be received by PVR 860 to alter the presentation of the recorded content (e.g., via alteration of audio 862 and video 864) as discussed above with respect to FIGS. 6 and 7.

Figure 9A:
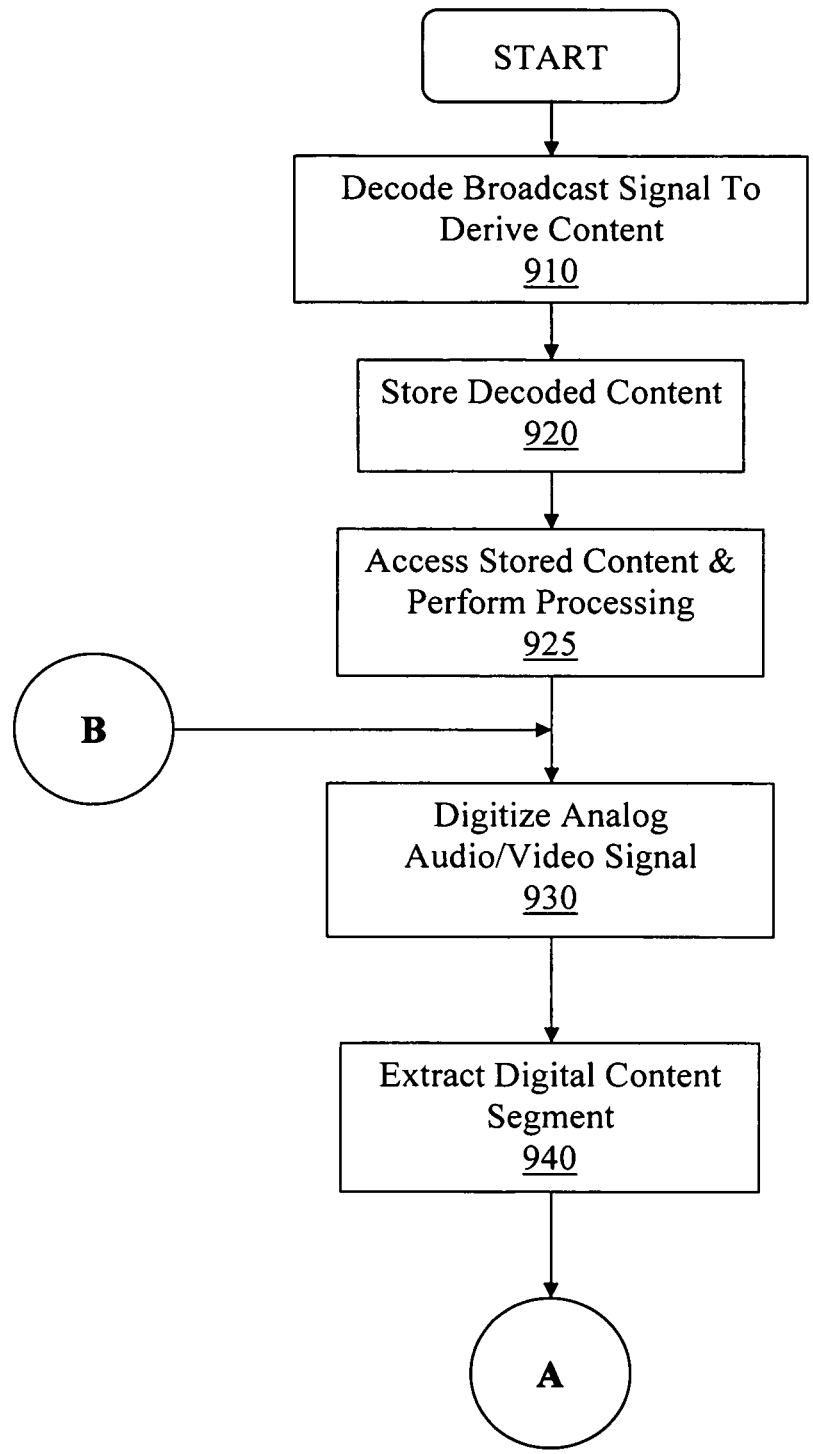
FIG. 9A shows a first portion of a computer-controlled process for alteration of presentations of recorded content in accordance with one embodiment of the present invention.
Figure 9B:
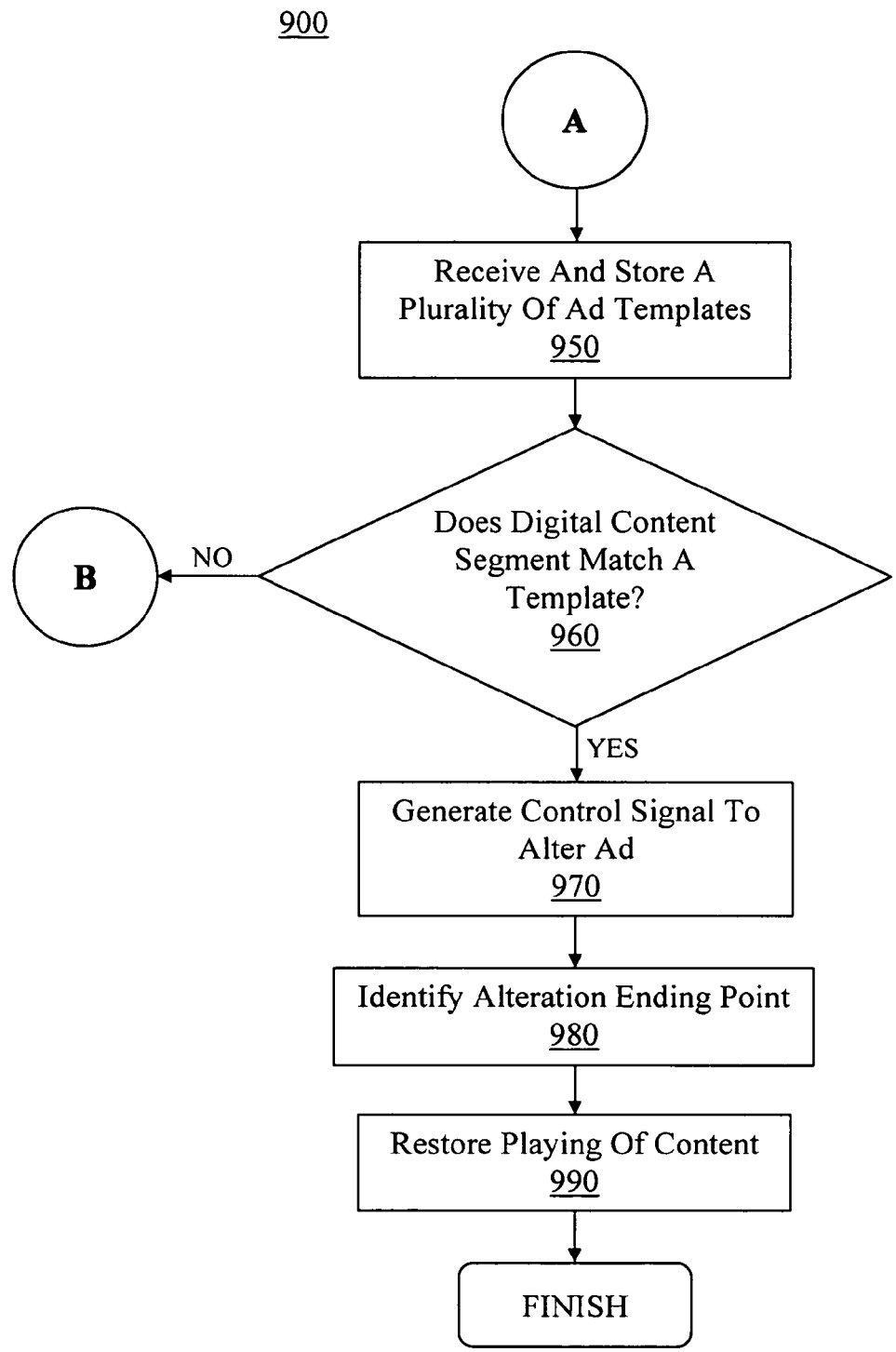
FIG. 9B shows a second portion of a computer-controlled process for alteration of presentations of recorded content in accordance with one embodiment of the present invention.

FIGS. 9A and 9B show computer-controlled process 900 for alteration of presentations of recorded content in accordance with one embodiment of the present invention. As the steps of process 900 are described herein, reference will be made to FIGS. 3, 5, 6, 7 and 8 to provide examples and help clarify the discussion.

As shown in FIG. 9A, step 910 involves decoding a broadcast signal. Such decoding may be performed by a set-top box (e.g., 710) or personal video recorder (e.g., 660 or 770) to derive content transmitted from a broadcaster (e.g., 620 or 720) over a terrestrial or wireless connection. Decoding may involve deriving separate audio and video signals. Alternatively, the combined audio and video signal may be converted to another form for later dissection. Additionally, the broadcast signal may be either digital or analog as discussed above, and may be encrypted for additional security. If encrypted, the decoding and decrypting may occur in any order.

After decoding and/or decrypting the broadcast signal to produce a decoded signal or signals, the decoded signal or signals may be converted to data and stored for later access by a PVR (e.g., 660 or 770) in step 920. As discussed above, the content may be stored in any device or component coupled to the PVR (e.g., a hard disk drive, flash memory, random access memory, read only memory, etc.).

As shown in FIG. 9A, step 925 involves accessing the stored content. Such access may be initiated by a user interface for the set-top box or PVR as discussed above. Alternatively, the PVR may access the content automatically upon the occurrence of an event (e.g., executing a playlist, timer set for delayed playback, etc.). Thereafter, the accessed content may be processed.

In a PVR capable of outputting digital and analog signals (e.g., 660 and/or 770), either digital or analog processing may be performed to ready the signal for transmission to the ad suppression device (e.g., 630, 730 and/or 830). For example, upon accessing the data stored in step 920 in digital form, digital processing may be performed if transmitted to the ad suppression device in digital form, or alternatively undergo either analog and/or digital processing if transmitted to the ad suppression device in analog form. In another embodiment, the PVR may perform analog and/or digital processing in step 925 regardless of the form of the signal transmitted to the ad suppression device.

As shown in FIG. 9A, step 930 involves digitizing analog audio and/or video signals comprising the broadcast content. As such, analog-to-digital conversion should be performed in step 930 along with any necessary signal processing (e.g., current-to-voltage conversion, amplification, etc.) to prepare the signals for comparison (e.g., by comparator 838) with ad templates (e.g., 300). Consequently, it should be appreciated that step 930 may be bypassed if the broadcast content is already in a digital format suitable for comparison.

Once a digital signal comprising the broadcast content is present, a digital content segment may be extracted in step 940. The extracted segment may be of a size and format enabling comparison with an audio/video segment of a downloaded template (e.g., 310). As such, it should be appreciated that the content segment may comprise more or less content than contained in the template.

As shown in FIG. 9B, step 950 involves receiving and storing a plurality of advertisement templates as discussed above with respect to step 450 of FIG. 4, where such templates may be downloaded to an ad suppression device (e.g., 630 or 730). Thereafter, a determination may then be made in step 960 as to whether a portion of the digital content segment (e.g., extracted in step 940) matches a portion of a stored template (e.g., audio/video segment 310), where the comparison may be performed by a comparator (e.g., 838) within the ad suppression device (e.g., 630, 730 and/or 830). If a template does not match a portion of the digital content segment, then steps 930, 940 and 950 may be repeated until a match is detected. This procedure may be repeated at various intervals to vary the precision of the advertisement detection and alteration mechanisms of the present invention as discussed above with respect to step 460 of FIG. 4.

However, if a portion of a digitized and/or encoded content segment matches a stored template, then a control signal may be generated to alter or suppress the advertisement in step 970. As discussed above with respect to FIGS. 6, 7 and 8, the ad suppression device (e.g., 630, 730 and/or 830) may send an audio/video alteration signal (e.g., 636, 736 and/or 836) to a PVR (e.g., 660, 770 and/or 860) playing recorded content containing an advertisement to be altered or suppressed. The audio and/or video alteration (e.g., muting, accelerated playback, skipping ahead, etc.) may continue until the advertisement being altered ends and the non-advertising content resumes. As such, an alteration ending point should be identified, at which time the presentation may be returned to an unaltered state.

In one embodiment, an alteration ending point may be identified in step 980 using durational information about an advertisement downloaded from an Internet connection (e.g., from Internet 650, 750 and/or 850), which may be performed in accordance with process 500 of FIG. 5. This information may be attached to an audio and/or video template (e.g., as durational information 320 of template 300). Alternatively, this information may be downloaded separately. If the durational information is downloaded separately, the ad suppression device (e.g., 630, 730 and/or 830) may optionally sort or group the templates and durational information packets to allow faster access to the durational information once an advertisement is identified. Moreover, it should be understood that separating the templates and durational information, the speed at which the ad suppression device may access and compare durational information may be increased given the smaller template sizes and the need to parse the template information from the combined data packet. Regardless of its location, the durational information may then be used to calculate the ending point of the advertisement by adding the duration of an advertisement to its estimated start point (e.g., the point at which a match was discovered). Thereafter, the alteration (e.g., accelerated playback) may be suspended at the calculated end point (e.g., automatically by the PVR).

Alternatively, a set of templates for the end of the advertisements (ending templates) may be downloaded and stored to the ad suppression device (e.g., similar to the templates corresponding to the beginning of advertisements in step 950 and depicted in FIG. 3). As such, by performing steps similar to 950 and 960 using the ending templates, digitized and/or encoded content segments may be compared against the ending templates to identify the end of the advertisement. Thereafter, alteration (e.g., accelerated playback) may be suspended at the identified end point (e.g., automatically by the PVR).

After suspending alteration, the presentation of the recorded content may be restored to an unaltered state in step 990. The restoration may be carried out using the same means discussed above with respect to using a control signal to alter the presentation of the content in step 970. As such, an audio/video alteration signal (e.g., 636, 736 and/or 836) from the ad suppression device may be used to return the presentation to an unaltered state.

In the foregoing specification, embodiments of the invention have been described with reference to numerous specific details that may vary from implementation to implementation. Thus, the sole and exclusive indicator of what is, and is intended by the applicant to be, the invention is the set of claims that issue from this application, in the specific form in which such claims issue, including any subsequent correction. Hence, no limitation, element, property, feature, advantage, or attribute that is not expressly recited in a claim should limit the scope of such claim in any way. Accordingly, the specification and drawings are to be regarded in an illustrative rather than a restrictive sense.

What is claimed is:

1. A system for altering a presentation of broadcast content, said system comprising:
    a digitizer operable to access a digital signal comprising said broadcast content;
    a memory operable to receive and store a plurality of test data structures;
    a comparator operable to compare, at intervals, said digital signal with at least some of the test data structures; and
    circuitry operable to generate a control signal responsive to a match of at least a portion of the digital signal with at least a portion of the test data structures, wherein said control signal is operable to alter a component of a presentation of said portion of said broadcast content, wherein a length of an interval between comparisons of the digital signal to the test data structures is a first length for a first period commencing with a match of at least a portion of the digital signal with at least a portion of the test data structures, the first period ending at a first time, the length of the interval between comparisons of the digital signal to the test data structures being shortened to a second length shorter than the first length upon the elapse of the first period.

2. The system of claim 1, wherein a test data structure comprises an intra-coded frame (I-frame) of said portion of said broadcast content.

3. The system of claim 1, wherein a test data structure comprises an audio data segment of said portion of said broadcast content.

4. The system of claim 1, wherein said plurality of test data structures are received over an Internet connection.

5. The system of claim 1, wherein said component comprises audio, and wherein said control signal causes a reduction in volume of said audio.

6. The system of claim 1, wherein said component comprises video, and wherein said control signal causes a display of supplemental content.

7. The system of claim 6, wherein said supplemental content comprises a blank frame.

8. The system of claim 1, wherein said control signal is a remote control signal.

9. The system of claim 1, wherein said digital signal is produced from an input signal of a camera capable of receiving a visual representation of said broadcast content.

10. The system of claim 1, wherein said digital signal is produced from an input signal of a microphone capable of receiving an aural representation of said broadcast content.

11. The system of claim 1, wherein each portion of said broadcast content is an advertisement.

* * * * *